US012466181B2

(12) United States Patent
Kusunoki et al.

(10) Patent No.: US 12,466,181 B2
(45) Date of Patent: Nov. 11, 2025

(54) INK JET HEAD

(71) Applicant: RISO Technologies Corporation, Tokyo (JP)

(72) Inventors: Ryutaro Kusunoki, Mishima Shizuoka (JP); Noboru Nitta, Tagata Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 128 days.

(21) Appl. No.: 18/346,619

(22) Filed: Jul. 3, 2023

(65) Prior Publication Data

US 2024/0066862 A1 Feb. 29, 2024

(30) Foreign Application Priority Data

Aug. 24, 2022 (JP) ................................. 2022-133445

(51) Int. Cl.
*B41J 2/045* (2006.01)

(52) U.S. Cl.
CPC ....... *B41J 2/04588* (2013.01); *B41J 2/04541* (2013.01); *B41J 2/04573* (2013.01); *B41J 2/04581* (2013.01)

(58) Field of Classification Search
CPC ......................... B41J 2/04588; B41J 2/04541; B41J 2/04596; B41J 2/04573; B41J 2/04593; B41J 2/14233; B41J 2/14201; B41J 2002/14483
See application file for complete search history.

(56) References Cited

U.S. PATENT DOCUMENTS

| | | | | |
|---|---|---|---|---|
| 6,450,603 | B1 | 9/2002 | Chang | |
| 6,899,409 | B2 | 5/2005 | Kusunoki | |
| 7,681,997 | B2 | 3/2010 | Kusunoki | |
| 11,648,768 | B2 | 5/2023 | Nitta | |
| 2018/0229496 | A1* | 8/2018 | Kikuchi | B41J 2/14209 |
| 2022/0134740 | A1 | 5/2022 | Saito | |

FOREIGN PATENT DOCUMENTS

| | | | |
|---|---|---|---|
| EP | 3875275 | A1 | 9/2021 |
| JP | H1016213 | A | 1/1998 |
| JP | 3618733 | B2 | 2/2005 |
| JP | 2022072000 | A | 5/2022 |
| JP | 2022149012 | A | 10/2022 |
| JP | 2022151020 | A | 10/2022 |

OTHER PUBLICATIONS

Extended European Search Report dated Jan. 4, 2024, mailed in counterpart European Application No. 23191865.7, 9 pages.

* cited by examiner

*Primary Examiner* — Thinh H Nguyen

(74) *Attorney, Agent, or Firm* — Kim & Stewart LLP

(57) ABSTRACT

According to one embodiment, an ink jet head includes a piezoelectric member to drive a pressure chamber, an electrode pair to apply a voltage to the piezoelectric member, and a common waveform generation circuit to generate a common waveform. The common waveform alternately includes an element of a first output waveform and an element of a second output waveform at a predetermined period. A switch is connected between a first electrode of the electrode pair and the common waveform generation circuit. A timing controller supplies a control signal to turn the switch on and off at the predetermined period such that the first or second output waveform can be selectively applied to the piezoelectric member to drive the pressure chamber to eject a liquid.

16 Claims, 6 Drawing Sheets

INK JET HEAD

CROSS-REFERENCE TO RELATED APPLICATION

This application is based upon and claims the benefit of priority from Japanese Patent Application No. 2022-133445, filed Aug. 24, 2022, the entire contents of which are incorporated herein by reference.

FIELD

Embodiments described herein relate generally to an ink jet head.

BACKGROUND

In an ink jet head, a drive waveform can be applied to an actuator that drives a pressure chamber to eject ink droplets. In order to form dots having different tones (gradation), the ink jet head may generate different drive waveforms for ejecting ink droplets of different volumes.

In the related art, ink jet heads have a problem in that the size of the required drive circuit increases with the inclusion of additional analog switches necessary for the use of each of the different types of drive waveforms.

DETAILED DESCRIPTION

According to at least one embodiment, there is provided an ink jet head that can effectively generate a plurality of different drive waveforms.

In general, according to one embodiment, an ink jet head includes a piezoelectric member configured to drive a pressure chamber, an electrode pair configured to apply a voltage to the piezoelectric member, and a common waveform generation circuit configured to generate a common waveform. The common waveform alternately includes an element of a first output waveform and an element of a second output waveform at a predetermined period (e.g., a regular interval or the like). A switch is connected between a first electrode of the electrode pair and the common waveform generation circuit. A timing controller is configured to supply a control signal to turn the switch on and off at the predetermined period.

Hereinafter, a non-limiting example embodiment will be described with reference to the drawings.

Figure 1:
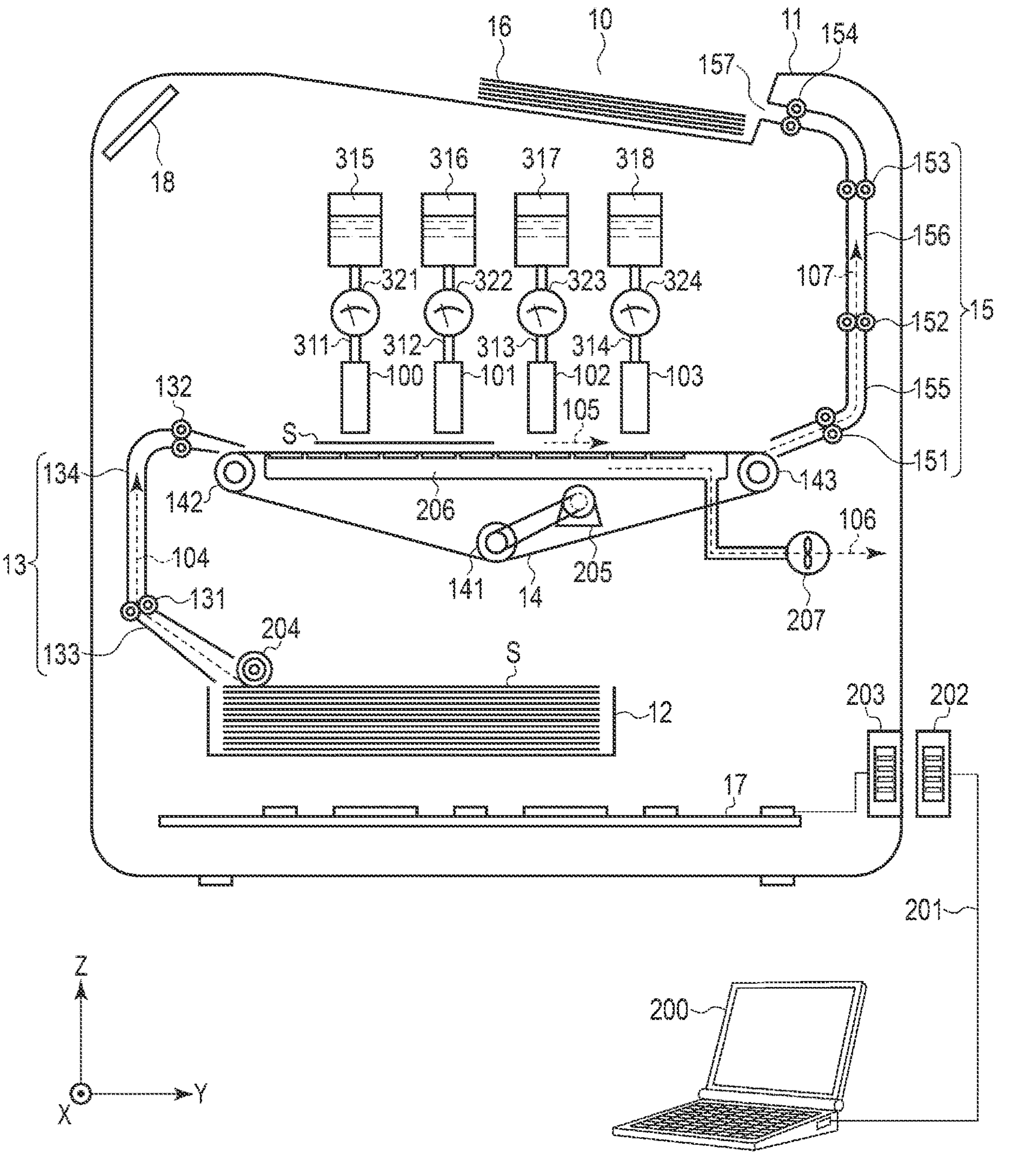
FIG. 1 is a diagram illustrating aspects of an ink jet printer according to an embodiment.

An ink jet printer 10 that prints an image on a recording medium will be described as an example of an image forming apparatus in which a liquid ejecting head according to the embodiment is mounted. FIG. 1 illustrates a schematic configuration of the ink jet printer 10. In the ink jet printer

10, a cassette 12 that accommodates a sheet S (a recording medium), an upstream conveyance path 13 of the sheet S, a conveyance belt 14 that conveys the sheet S from the cassette 12, a plurality of ink jet heads (ink jet heads 100, 101, 102, 103) that eject ink droplets onto the sheet S on the conveyance belt 14, a downstream conveyance path 15 of the sheet S, a discharge tray 16, and a control substrate 17 (e.g., a controller board) are disposed in a housing 11. An operation unit 18 that is a user interface is disposed on the upper portion side of the housing 11.

Image data for printing on the sheet S is generated by, for example, a computer 200 that is an external connection apparatus. The image data generated by the computer 200 is transmitted to the control substrate 17 of the ink jet printer 10 through a cable 201, a connector 202, and a connector 203.

A pickup roller 204 supplies the sheets S from the cassette 12 to the upstream conveyance path 13 one by one. The upstream conveyance path 13 is configured with feed roller pairs 131 and 132 and sheet guide plates 133 and 134. The sheet S is conveyed to an upper surface of the conveyance belt 14 through the upstream conveyance path 13. In the drawing, an arrow 104 indicates a conveyance path of the sheet S from the cassette 12 to the conveyance belt 14.

The conveyance belt 14 is an endless belt of a net-like or mesh material in which a plurality of through holes or the like are formed. Three rollers including a driving roller 141, a driven roller 142, and a driven roller 143 support the conveyance belt 14 such that the conveyance belt 14 is rotatable. A motor 205 rotates the driving roller 141 to rotate the conveyance belt 14. The motor 205 is an example of a driving apparatus. In the drawing, an arrow 105 indicates a rotation direction of the conveyance belt 14. On the back surface side of the conveyance belt 14, a negative pressure container 206 is disposed. The negative pressure container 206 is connected to a fan 207 for depressurization. The fan 207 adjusts the inside of the negative pressure container 206 to be at a negative pressure (relative to atmosphere) using air flow produced by the fan 207 such that the sheet S will held on the upper surface of the conveyance belt 14. In the drawing, an arrow 106 indicates the flow of the air flow.

The ink jet heads 100 to 103 (each an example of a liquid ejecting head) are disposed to face the sheet S on the conveyance belt 14 across a small gap of, for example, 1 mm. The ink jet heads 100 to 103 eject ink droplets onto the sheet S. As the sheet S passes through a region below the ink jet heads 100 to 103, an image is printed on the sheet S. The ink jet heads 100 to 103 have the same structure except that the colors of inks to be ejected are different from each other. The colors of the inks are, for example, cyan, magenta, yellow, and black.

The ink jet heads 100 to 103 are connected to ink tanks 315, 316, 317, 318 and ink supply pressure adjusting devices 321, 322, 323, 324 through ink flow paths 311, 312, 313, 314, respectively. The ink tanks 315 to 318 are disposed above the ink jet heads 100 to 103, respectively. During a stand-by (e.g., a ready or non-printing state), the ink supply pressure adjusting devices 321 to 324 adjust the insides of the ink jet heads 100 to 103 to be in a negative pressure of, for example, −1.2 kPa with respect to the atmospheric pressure, such that leakage of ink from nozzles 25 (refer to FIG. 2) in the ink jet heads 100 to 103 is prevented. During image formation, the inks from the ink tanks 315 to 318 are supplied to the ink jet heads 100 to 103 by the ink supply pressure adjusting devices 321 to 324, respectively.

After image formation (printing), the sheet S is conveyed from the conveyance belt 14 to the downstream conveyance path 15. The downstream conveyance path 15 is configured with: feed roller pairs 151, 152, 153, 154; and a sheet guide plate 155 and a sheet guide plate 156 that regulate the conveyance path of the sheet S. The sheet S is conveyed from a discharge port 157 to a discharge tray 16 through the downstream conveyance path 15. In the drawing, an arrow 107 indicates the conveyance path of the sheet S.

Next, a configuration of the ink jet heads 100 to 103 will be described. Hereinafter, the ink jet head 100 will be described with reference to FIGS. 2 and 3. The ink jet heads 101 to 103 also have the same structure as the ink jet head 100.

Figure 2:
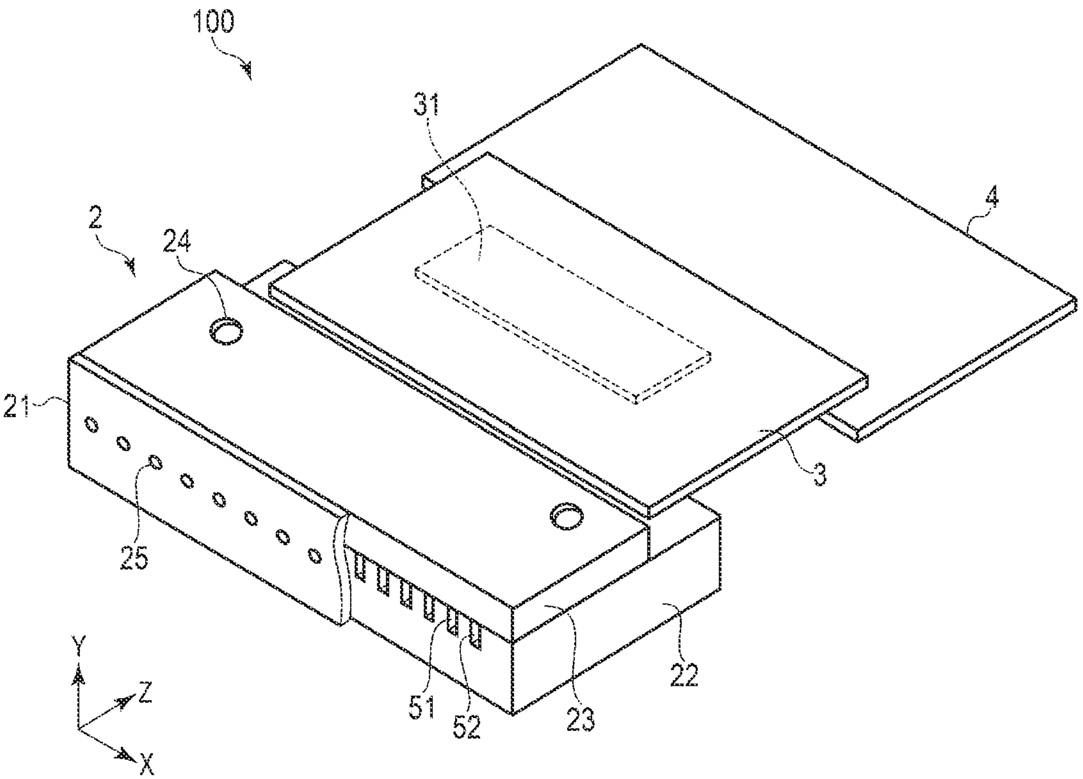
FIG. 2 is a perspective view of an ink jet head.

As illustrated in FIG. 2, the ink jet head 100 includes: a nozzle head unit 2 that is an example of a liquid ejecting unit; and a flexible printed wiring board 3 that is an example of a printed wiring substrate. The nozzle head unit 2 includes a nozzle plate 21, an actuator substrate 22, a sealing member 23 that covers otherwise open portions of each pressure chamber 51 and each air chamber 52 formed as grooves on the actuator substrate 22, and an ink supply port 24 that is formed in the sealing member 23. The ink supply port 24 is connected to the ink supply pressure adjusting device 321 of FIG. 1 through an ink flow path 311.

The flexible printed wiring board 3 is connected to the actuator substrate 22 of the nozzle head unit 2 and a printed circuit board 4 as a relay board. On the flexible printed wiring board 3, a driving integrated circuit (IC) 31 is mounted (hereinafter, referred to as "driver IC" or a "drive chip"). The driver IC 31 temporarily stores print data received from the control substrate 17 of the ink jet printer 10 that is transmitted through the printed circuit board 4. At a predetermined timing, a drive signal is applied to each of channels to eject ink in a manner corresponding to the print data.

The nozzle plate 21 is, for example, a rectangular plate that is formed of a resin such as polyimide or a metal such as stainless steel. A plurality of the nozzles 25 for ejecting ink are formed on the surface of the nozzle plate 21. The nozzle density is set to be in a range of, for example, 150 to 1,200 dpi.

Figure 3:
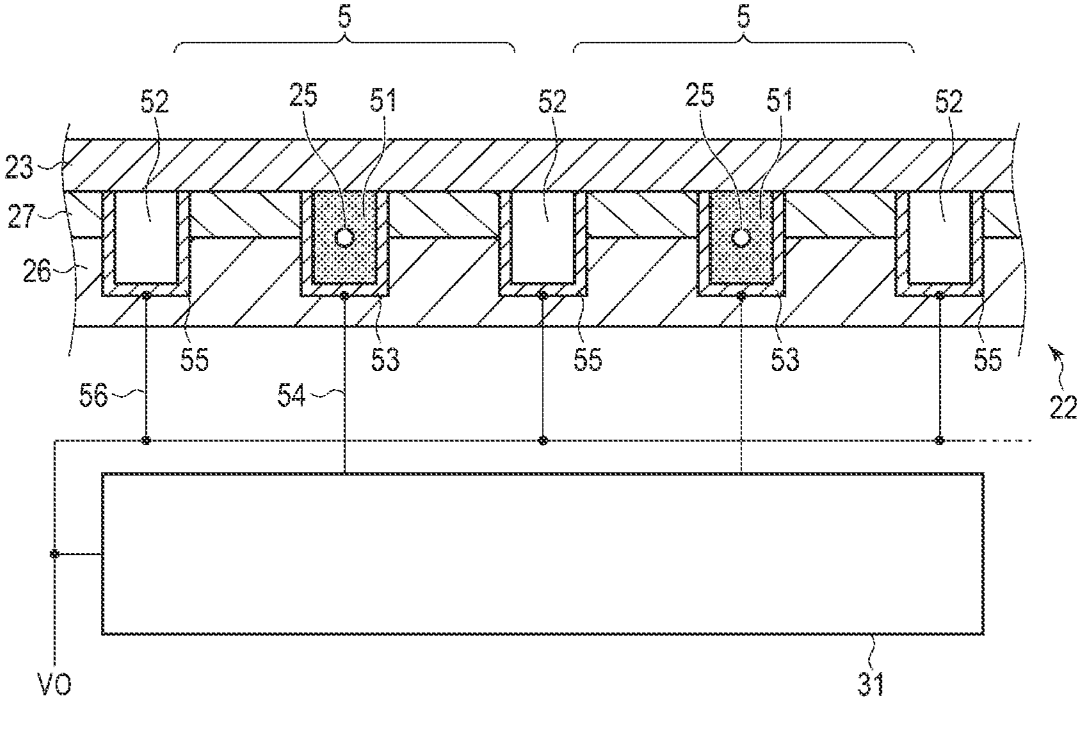
FIG. 3 is a cross-sectional view of an actuator.

The actuator substrate 22 is, for example, a rectangular substrate that is formed of an insulating ceramic. As illustrated in FIG. 3, in the actuator substrate 22, a plurality of the pressure chambers 51 and a plurality of the air chambers 52 are alternately formed along an X direction. The pressure chambers 51 communicate with the nozzles 25. The pressure chambers 51 communicate with the ink supply port 24 through a common ink chamber or the like formed in the actuator substrate 22 and/or the sealing member 23. That is, the nozzle head unit 2 supplies ink to the pressure chambers 51 of each of the channels through the ink supply port 24. That is, the nozzle head unit 2 functions as both a liquid ejecting unit and a liquid supply unit. On the other hand, the air chambers 52 disposed adjacent to the pressure chambers 51 are each a closed space that does not communicate with a nozzle 25 or the common ink chamber. The pressure chambers 51 and the air chambers 52 are formed by cutting portions of the piezoelectric members 26 and 27. For example, rectangular grooves having a depth direction in a Y direction and a length direction along a Z direction are cut into the piezoelectric members 26 and 27. The grooves are spaced from each other in the Z direction. The piezoelectric members 26 and 27 can be stacked on the actuator substrate 22 in a direction (for example, a facing direction) opposite to a polarization direction. The remaining portions of the piezoelectric members 26 and 27 left after the groove cutting (or the like) form the sidewalls of the pressure chambers 51 and the air chambers 52.

An electrode 53 can be formed as continuous film on a bottom surface and both side surfaces of each pressure chamber 51. The electrode 53 for a pressure chamber 51 is connected to a discrete wiring 54. An electrode 55 can be formed as a continuous film on a bottom surface and both side surfaces of the air chamber 52. The electrode 55 for each air chamber 52 is connected to a common wiring 56. A connection point between an electrode 53 of a pressure chamber 51 and the corresponding discrete wiring 54 is one terminal of an actuator 5. A connection point between an electrode 55 of an air chamber 52 and the common wiring 56 is another terminal of the actuator 5. The electrode 53, the electrode 55, the discrete wiring 54, and the common wiring 56 are formed of, for example, a nickel thin film. The discrete wiring 54 is connected to the driver IC 31 (that is, the drive circuit for each of the channels). The driver IC 31 applies a drive voltage as a drive signal to the actuator 5 of each of the channels. The common wiring 56 is connected to a voltage V0 (for example, a ground (GND) voltage). Due to this configuration, in an actuator 5 to which the drive voltage is applied, an electric field is applied in a direction intersecting with (preferably, orthogonal to) polarization axes of the piezoelectric members 26 and 27, and the piezoelectric members 26 and 27 that serve as the side walls of the actuator 5 are deformed symmetrically in a shear mode.

That is, the pressure chamber 51 of the ink is formed to be interposed between a pair of the columnar actuators 5 using the piezoelectric members 26 and 27. By applying a potential difference to both walls of the columnar actuator 5, that is, an inner wall and an outer wall of the pressure chamber 51 and charging and discharging the capacitive actuator 5 using the piezoelectric members 26 and 27, the actuator 5 is deformed. That is, the piezoelectric members 26 and 27 drive (expand/contract) the pressure chamber 51. As a result, the volume of the pressure chamber 51 changes, and thus the ink pressure in the pressure chamber 51 changes. By adjusting the size and the timing of the change, ink droplets can be ejected from the nozzles 25.

Figure 4:
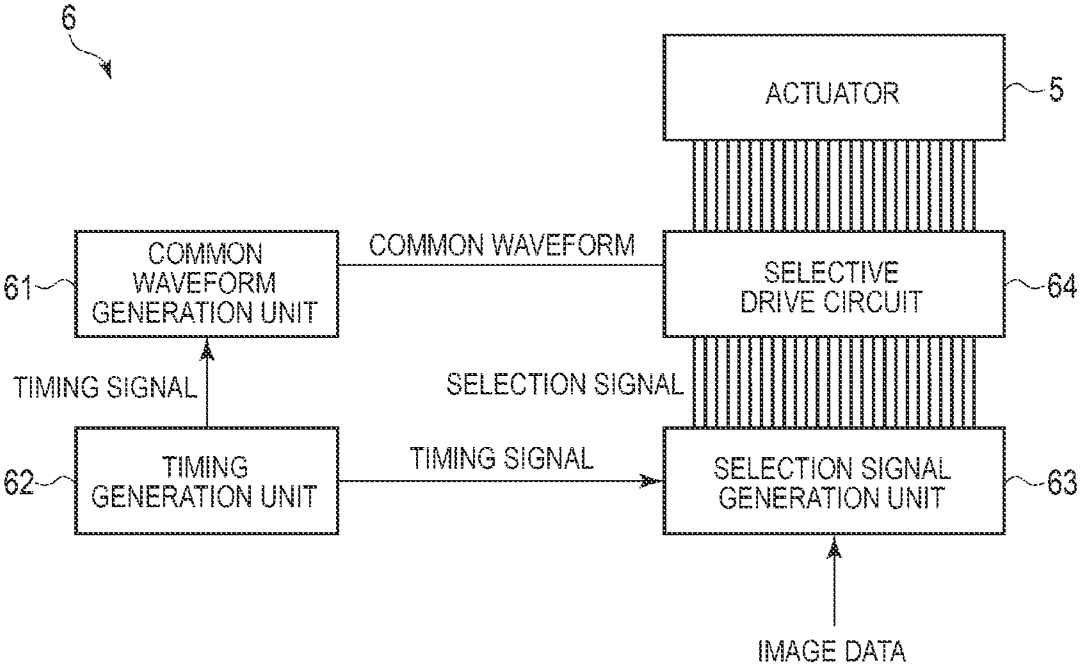
FIG. 4 is a block diagram of an ink jet head drive circuit.

FIG. 4 is a diagram illustrating a block configuration of an ink jet head drive circuit 6 in the driver IC 31. The ink jet head drive circuit 6 includes a common waveform generation unit 61, a timing generation unit 62 (timing controller), a selection signal generation unit 63, and a selective drive circuit 64. The common waveform generation unit 61 may be provided outside the ink jet head drive circuit 6.

The common waveform generation unit 61 (common waveform generation mechanism) generates a repeating waveform described below as a common waveform. The common waveform is transmitted to the selective drive circuit 64. The timing generation unit 62 (control mechanism or timing controller) synchronizes operation timings of the common waveform generation unit 61 and the selection signal generation unit 63. The selection signal generation unit 63 generates a selection signal in accordance with image data for each of the channels and transmits the generated selection signal to the selective drive circuit 64. The image data for each of the channels includes whether or not ink is to be ejected from the channel as well as tone information (e.g., ejected ink volume) for the dots to be formed when ink is ejected by a nozzle 25.

Next, an equivalent circuit of the actuator 5 and the selective drive circuit 64 will be described.

Figure 5:
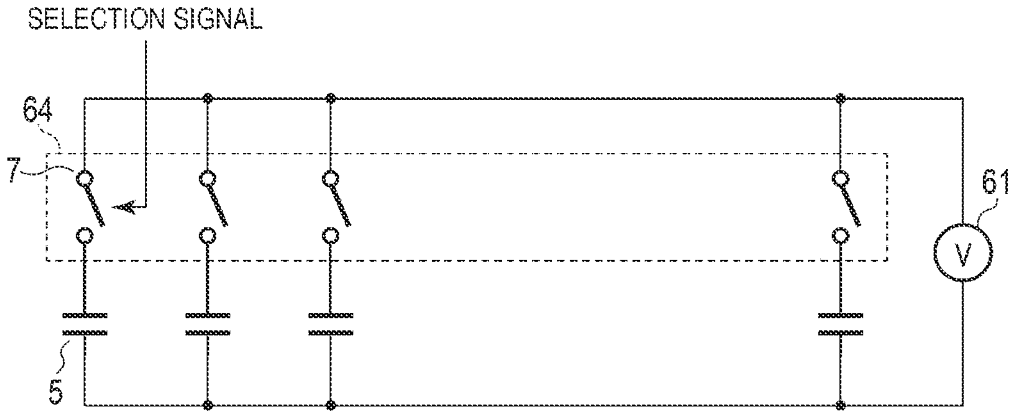
FIG. 5 is an equivalent circuit diagram of an ink jet head.

FIG. 5 is a circuit diagram illustrating the equivalent circuit of a plurality of actuators 5 and the selective drive circuit 64. As illustrated in FIG. 5, the selective drive circuit 64 includes individual switches 7 connected to each of the actuators 5. Each of the switches 7 can be controlled to be turned on or off based on a selection signal supplied to the selective drive circuit 64.

Each switch 7 and actuator 5 pair is connected in parallel to the common waveform generation unit 61 5.

Each switch 7 serves to connect (or disconnect) the common waveform generation unit 61 and the respective actuator 5. That is, the switch 7 connects the common waveform generation unit 61 to the electrode 53 (individual electrode) of the actuator 5. If the switch 7 is turned on (closed), the common waveform will be applied to the actuator 5. If the switch 7 is turned off (open), the switch 7 has high impedance, and the actuator 5 maintains its the original displacement (no ejection).

Each of the switches 7 can be controlled to be turned on or off based on the selection signal from the selection signal generation unit 63.

The actuators 5 correspond to a capacitor in this context.

Next, an operation example in which the ink jet head drive circuit 6 generates a drive waveform will be described.

Figure 6:
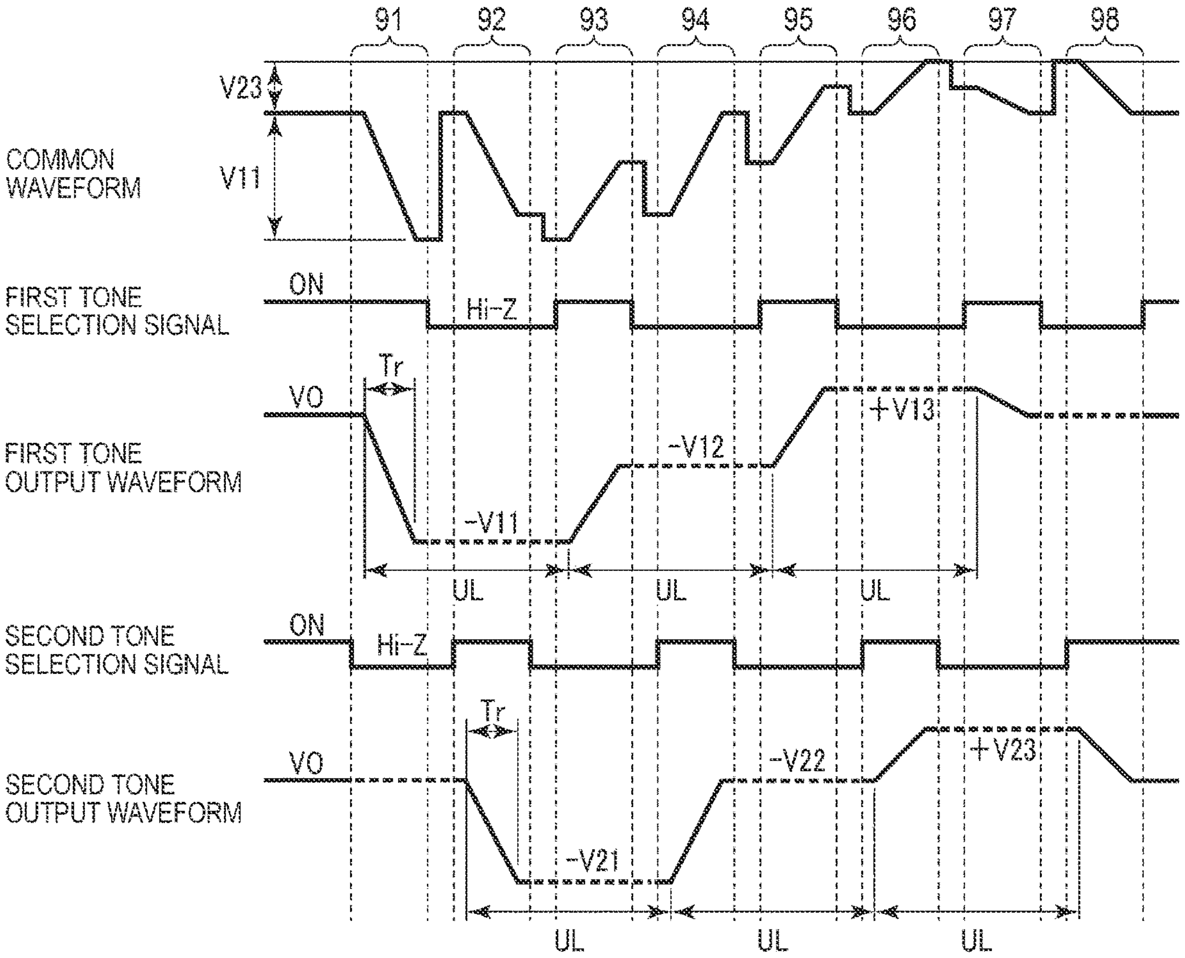
FIG. 6 is a timing chart illustrating aspects of an operation example of an ink jet head drive circuit.

FIG. 6 is a timing chart illustrating the operation example in which the ink jet head drive circuit 6 generates the drive waveform.

Here, the ink jet head drive circuit 6 generates a first tone output waveform for forming dots having a first tone and a second tone output waveform for forming dots having a second tone.

The first tone output waveform (first output waveform) is a pulse waveform in which a voltage changes from voltage V0 to a voltage V11, to a voltage V12, and to a voltage V13 in this chronological order. Each of waveform sections at the voltage V11, the voltage V12, and the voltage V13 (including the periods where the voltage changes from one level to the next) has a length of UL. Here, the value UL is ½ of a main acoustic resonance period of the pressure chamber 51 which may be calculated based on pressure chamber dimensions and the like.

Likewise, the second tone output waveform (second output waveform) is a pulse waveform in which a voltage changes from voltage V0 to a voltage V21, to a voltage V22, and to a voltage V23 in this chronological order. Each of waveform sections at the voltage V21, the voltage V22, and the voltage V23 (including the periods where the voltage changes from one level to the next) has a length of UL.

In addition, a voltage contributing to an ejection velocity of ink droplets is given from the following expression.

The voltage contributing to the ejection velocity=V0−V1+V2−V1=V0+V2−V1×2, where V1 is the voltage V11 or the voltage V21, and V2 is the voltage V12 or the voltage V22.

In addition, the voltage contributing to an ejection velocity in the first tone output waveform=the voltage contributing to an ejection velocity in the second tone output waveform is satisfied. That is, the following expression is satisfied:

$$V0+V12-V11\times 2=V0+V22-V21\times 2.$$

That is, the ejection velocity of ink droplets ejected from the pressure chamber 51 with the first tone output waveform matches the ejection velocity of ink droplets ejected from the pressure chamber 51 with the second tone output waveform.

In addition, a voltage contributing to suppressing (canceling) pressure vibration is given from the following expression.

The voltage contributing to the cancellation=V3−V2+V3−V0=V3×2−V2−V0, where V3 is the voltage V13 or the voltage V23 and the voltage V2 is as before.

Here, the voltage contributing to the ejection velocity=the voltage contributing to the cancellation is satisfied. That is, the first tone output waveform and the second tone output waveform satisfy the following expression:

$$V0+V2-V1\times 2=V3\times 2-V2-V0.$$

That is, the first tone output waveform and the second tone output waveform can suppress pressure vibration generated by an ejection.

The common waveform generated by the common waveform generation unit 61 is configured with an element of the first tone output waveform and an element of the second tone output waveform. That is, the common waveform is configured with a section where the voltage of the first tone output waveform changes and a section where the voltage of the second tone output waveform changes.

The common waveform includes sections 91 to 98 in chronological order at predetermined period (interval).

The section 91 includes an element of the first tone output waveform. The section 91 is where the voltage of the first tone output waveform changes from the voltage V0 to the voltage V11.

The section 92 includes an element of the second tone output waveform. The section 92 is where the voltage of the second tone output waveform changes from the voltage V0 to the voltage V21.

The section 93 includes an element of the first tone output waveform. The section 93 is where the voltage of the first tone output waveform changes from the voltage V11 to the voltage V12.

The section 94 includes an element of the second tone output waveform. The section 94 is where the voltage of the second tone output waveform changes from the voltage V21 to the voltage V22.

The section 95 includes an element of the first tone output waveform. The section 95 is where the voltage of the first tone output waveform changes from the voltage V12 to the voltage V13.

The section 96 includes an element of the second tone output waveform. The section 96 is where the voltage of the second tone output waveform changes from the voltage V22 to the voltage V23.

The section 97 includes an element of the first tone output waveform. The section 97 is where the voltage of the first tone output waveform changes from the voltage V13 to the voltage V0.

The section 98 includes an element of the second tone output waveform. The section 98 is where the voltage of the second tone output waveform changes from the voltage V23 to the voltage V0.

As illustrated in FIG. 6, the common waveform alternately (section to section) includes an element of the first tone output waveform and the second tone output waveform. In addition, the length between the elements of the first tone output waveform (the length from the head of the element to the head of the next element in the same output waveform) is UL. Likewise, the length between the elements of the second tone output waveform is also UL.

A first tone selection signal is a selection signal output from the selection signal generation unit 63. The first tone selection signal generates the first tone output waveform.

The first tone selection signal is in an ON state whenever the common waveform outputs (includes) an element of the first tone output waveform. That is, the first tone selection signal is in an ON state for the sections 91, 93, 95, and 97. The first tone selection signal is in an OFF state for the other periods. That is, the first tone selection signal is in an OFF state for the sections 92, 94, 96, and 98.

The selection signal generation unit 63 turns on a switch 7 based on the first tone selection signal in a predetermined phase (first phase) at the predetermined period of UL to apply the first tone output waveform (embedded in the common waveform) to the corresponding actuator 5. The predetermined period is a regular interval until a series of ink discharge is completed.

A second tone selection signal is a selection signal output from the selection signal generation unit 63. The second tone selection signal generates the second tone output waveform. The second tone selection signal is in an ON state whenever the common waveform outputs (includes) an element of the second tone output waveform. That is, the second tone selection signal is in an ON state for the sections 92, 94, 96, and 98. The second tone selection signal is in an OFF state for the other periods. That is, the second tone selection signal is in an OFF state for the sections 91, 93, 95, and 97.

The selection signal generation unit 63 turns on a switch 7 based on the second tone selection signal in a phase (second phase) different from the first phase at the period of UL to apply the second tone output waveform (embedded in the common waveform) to the corresponding actuator 5.

Figure 7:
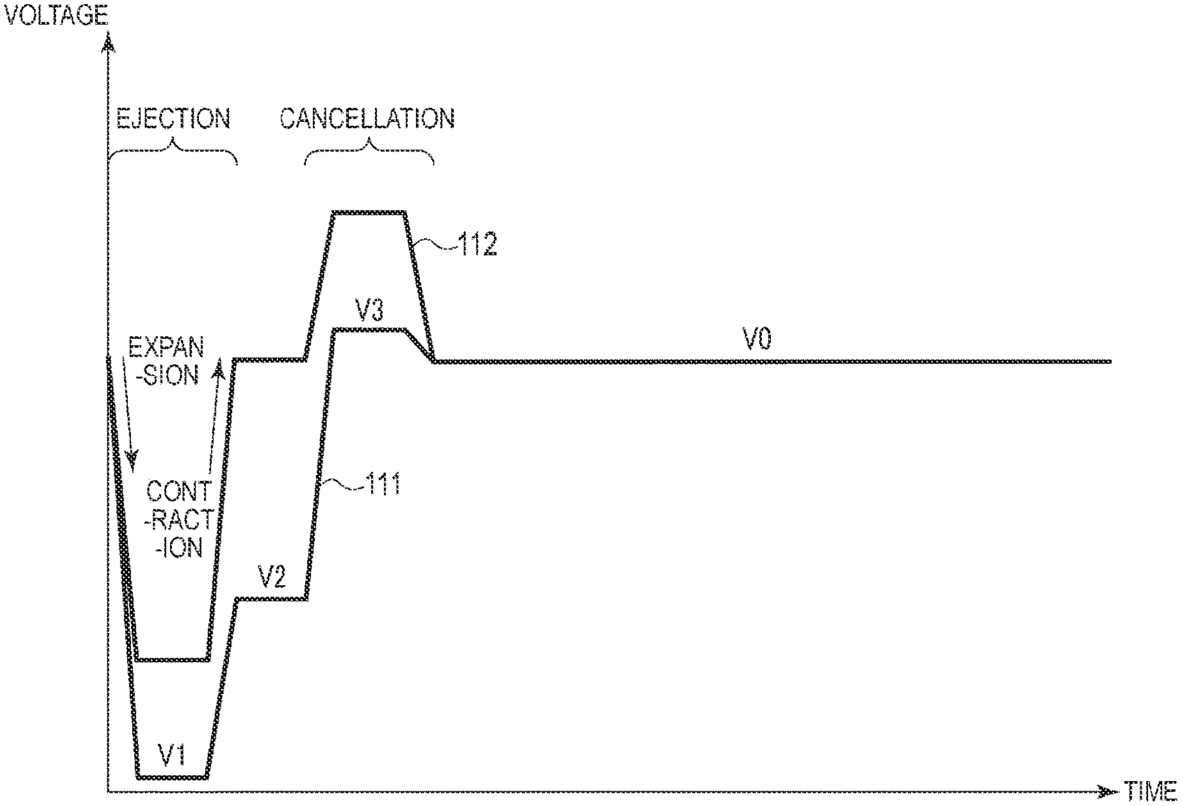
FIG. 7 is a graph illustrating an example of an output waveform.

FIG. 7 illustrates the first tone output waveform and the second tone output waveform. In FIG. 7, the horizontal axis represents the time and the vertical axis represents a voltage level.

FIG. 7 illustrates a graphline 111 and a graphline 112.

The graphline 111 shows the first tone output waveform. As shown by the graphline 111, in a section where the switch 7 has high impedance (off state), the voltage applied to the actuator 5 is constant at the previous applied voltage.

The graphline 112 shows the second tone output waveform. As shown by the graphline 112, in a section where the switch 7 has high impedance, the voltage applied to the actuator 5 is constant at the previous applied voltage.

The first tone output waveform and the second tone output waveform each change from V0 to V1 to expand a pressure chamber 51. Next, the first tone output waveform and the second tone output waveform change from V1 to V2 to contract the pressure chamber 51.

When the pressure chamber 51 contracts, the pressure vibration in the pressure chamber 51 increases such that ink droplets are ejected from the nozzle 25. The ink droplets are ejected in a section where the voltage applied to the actuator 5 is V2.

Next, the first tone output waveform and the second tone output waveform change from V2 to V3 to further contract the pressure chamber 51. As a result, the pressure vibration in the pressure chamber 51 is suppressed.

Next, the displacement of meniscus formed in the nozzle 25 will be described.

The first tone output waveform and the second tone output waveform have the same voltage ($V0+V2-V1\times2$) that contributes to ejection. The first tone output waveform and the second tone output waveform are different in the voltage V1 for expanding the pressurizing chamber 51. Therefore, in each waveform, the retraction amount of the meniscus is different, and as a result, the ejection volume for each waveform is different.

Figure 8:
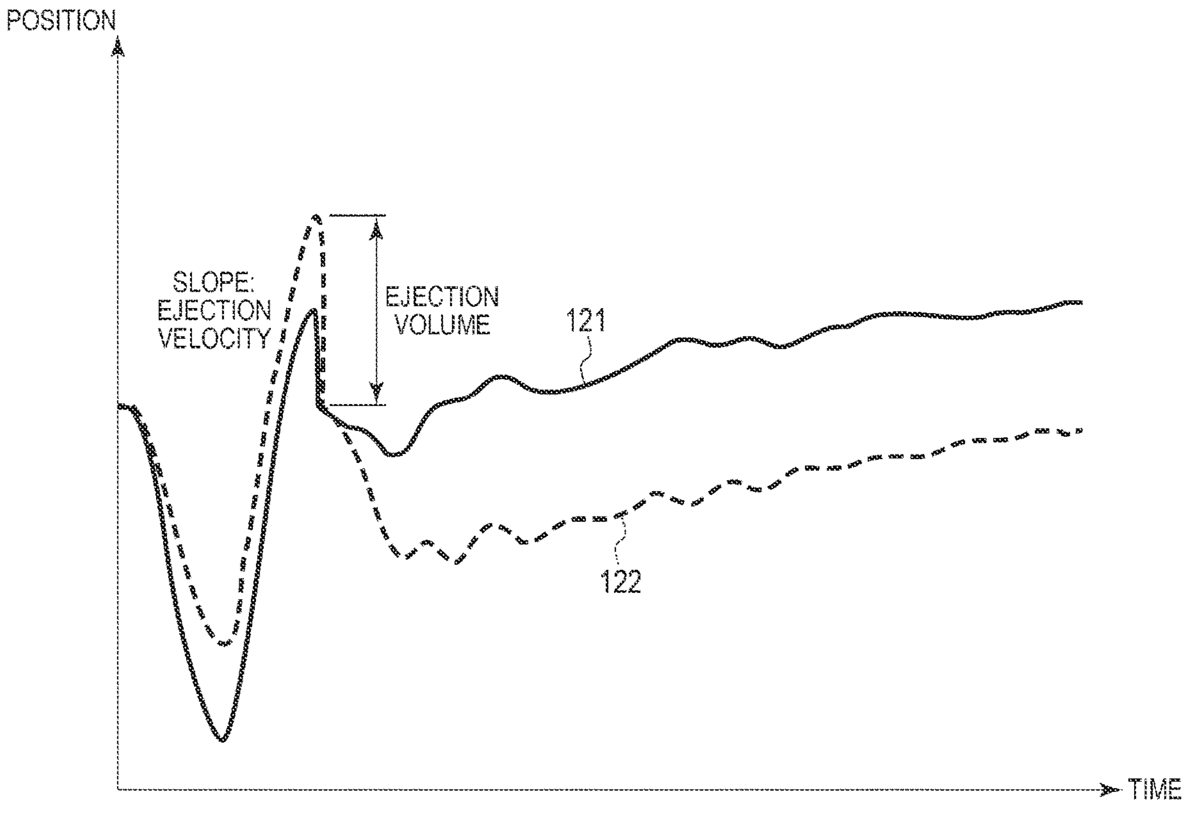
FIG. 8 is a graph illustrating an example of displacement of a meniscus.

FIG. 8 illustrates the displacement of meniscus formed in a nozzle 25 for different output waveforms. In FIG. 8, the horizontal axis represents the time and the vertical axis represents the position of the meniscus relative to a nozzle position.

FIG. 8 illustrates a graphline 121 and a graphline 122.

The graphline 121 shows the position of the meniscus formed in a nozzle 25 when the first tone output waveform is applied to the actuator 5.

The graphline 122 shows the position of the meniscus formed in a nozzle 25 when the second tone output waveform is applied to the actuator 5.

As shown by the graphlines 121 and 122, an ink droplet is separated from the meniscus at a predetermined timing. This separated ink droplet is ejected to the sheet S for printing (dot formation).

The slopes of the graphline 121 and the graphline 122 correspond to the ejection velocity of the ejected ink droplet(s).

As shown by the graphline 121 and the graphline 122, both of the slopes are substantially the same in the relevant section. That is, the ejection velocity of the ink droplet formed by the first tone output waveform is substantially the same as the ejection velocity of the ink droplet formed by the second tone output waveform.

The difference between the position of the meniscus immediately before the separation of the ink droplet and the position of the meniscus immediately after the separation of the ink droplet is proportional to the volume of the ejected ink droplet.

As illustrated in FIG. 8, the difference for the graphline 121 is less than the difference for the graphline 122. Accordingly, the volume of the ink droplet formed by the first tone output waveform is less than the volume of the ink droplet formed by the second tone output waveform.

In other examples, the common waveform to be utilized in a similar method may include elements for three or more output waveforms (e.g., three or more different droplet volumes or the like). In this case, the selection signal generation unit 63 supplies a selection signal for generating each of the multiple output waveforms to the selective drive circuit 64.

In addition, the ejection velocities of the ink droplets formed by the respective output waveforms may be different from each other in some cases rather than substantially the same.

In addition, in some examples, the actuators 5 may be obtained by dicing a stacked piezoelectric member joined to a base member for grooving such that a required number of piezoelectric pillars are formed in a comb tooth shape on one piezoelectric member at predetermined intervals.

The ink jet head configured as described above outputs a common waveform that is configured with elements of a plurality of output waveforms to be selectively applied. The ink jet head supplies the selection signal for selecting the waveform to the switch that connects the common waveform generation unit generating the common waveform and the actuator. As a result, the ink jet head can generate the plurality of output waveforms without requiring a separate analog switch for each of the possible output waveforms.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ink jet head, comprising:
   a piezoelectric member configured to drive a pressure chamber;
   an electrode pair configured to apply a voltage to the piezoelectric member;
   a common waveform generation circuit configured to generate a common waveform from a first output waveform for ejecting a first volume of liquid and a second output waveform for ejecting a second volume of the liquid that is different from the first volume, the common waveform alternately including an element of the first output waveform and an element of the second output waveform at a predetermined period;
   a switch connected between a first electrode of the electrode pair and the common waveform generation circuit; and
   a timing controller configured to supply a control signal to turn the switch on and off at the predetermined period.

2. The ink jet head according to claim 1, wherein the timing controller is configured to:
   turn the switch on and off at a first phase to apply the first output waveform to the piezoelectric member, and
   turn the switch on and off at a second phase different from the first phase to apply the second output waveform to the piezoelectric member.

3. The ink jet head according to claim 1, wherein the predetermined period is ½ of a main acoustic resonance period of a pressure chamber formed by the piezoelectric member.

4. The ink jet head according to claim 1, wherein a voltage contributing to ejection according to the first output waveform and a voltage contributing to ejection according to the second output waveform match with each other.

5. The ink jet head according to claim 4, wherein the voltages contributing to the ejection according to the first output waveform and the second output waveform match a voltage contributing to suppressing pressure vibration in the pressure chamber.

6. The ink jet head according to claim 1, further comprising:
   a selection controller configured to:
      receive the control signal from the timing controller and image data for a printing operation, and
      output a switch control signal to open and close the switch according to the received control signal and the image data.

7. The ink jet head according to claim 1, wherein, when the switch is turned on, the piezoelectric member is driven according to the common waveform, and when the switch is turned off, the piezoelectric member maintains a prior displacement state of the piezoelectric member.

8. A liquid ejection apparatus, comprising:
   an ink jet head positioned to eject liquid as droplets toward a target object, the ink jet head including:
      a piezoelectric member configured to drive a pressure chamber connected to a nozzle for ejecting the liquid as droplets;
      an electrode pair configured to apply a voltage to the piezoelectric member;
      a common waveform generation circuit configured to generate a common waveform from a first output waveform for ejecting a first volume of the liquid and a second output waveform for ejecting a second volume of the liquid that is different from the first volume, the common waveform alternately including an element of the first output waveform and an element of the second output waveform at a predetermined period;
      a switch connected between a first electrode of the electrode pair and the common waveform generation circuit; and
      a timing controller configured to supply a control signal to turn the switch on and off at the predetermined period.

9. The liquid ejection apparatus according to claim 8, wherein the timing controller is configured to:
   turn the switch on and off at a first phase to apply the first output waveform to the piezoelectric member, and
   turn the switch on and off at a second phase different from the first phase to apply the second output waveform to the piezoelectric member.

10. The liquid ejection apparatus according to claim 8, wherein the predetermined period is ½ of a main acoustic resonance period of a pressure chamber formed by the piezoelectric member.

11. The liquid ejection apparatus according to claim 8, wherein a voltage contributing to ejection according to the first output waveform and a voltage contributing to ejection according to the second output waveform match with each other.

12. The liquid ejection apparatus according to claim 11, wherein the voltages contributing to the ejection according to the first output waveform and the second output waveform match a voltage contributing to suppressing pressure vibration in the pressure chamber.

13. The liquid ejection apparatus according to claim 8, further comprising:
   a selection controller configured to:
      receive the control signal from the timing controller and image data for a printing operation, and
      output a switch control signal to open and close the switch according to the received control signal and the image data.

14. The liquid ejection apparatus according to claim 8, wherein, when the switch is turned on, the piezoelectric member is driven according to the common waveform, and when the switch is turned off, the piezoelectric member maintains a prior displacement state of the piezoelectric member.

15. An ink jet head, comprising:
   an actuator with a plurality of nozzles, each nozzle connected to one of a plurality of pressure chambers, each pressure chamber configured to be expanded and contracted by one of a plurality of piezoelectric members;
   a common electrode connected to each of the plurality of piezoelectric members;
   a plurality of individual electrodes, each individual electrode connected to one of the plurality of piezoelectric members;
   a common waveform generation circuit configured to generate a common waveform from a first output waveform for ejecting a first volume of liquid and a second output waveform for ejecting a second volume of liquid that is different from the first volume, the common waveform alternately including an element of the first output waveform and an element of the second output waveform at a predetermined period;

a plurality of switches, each switch connected between one of the individual electrodes and the common waveform generation circuit; and a timing controller configured to supply a control signal to turn the switches on and off at the predetermined period.

16. The ink jet head according to claim 15, wherein the timing controller is configured to:

turn the switches on and off at a first phase to apply the first output waveform to the respective piezoelectric member, and turn the switches on and off at a second phase different from the first phase to apply the second output waveform to the respective piezoelectric member.

* * * * *